United States Patent
Gingrich

(10) Patent No.: US 11,810,327 B1
(45) Date of Patent: *Nov. 7, 2023

(54) SYSTEMS AND METHODS FOR CALIBRATING DISTANCE ESTIMATION IN IMAGE ANALYSIS

(71) Applicant: United Services Automobile Association (USAA), San Antonio, TX (US)

(72) Inventor: Jess W. Gingrich, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,637

(22) Filed: Oct. 2, 2022

Related U.S. Application Data

(63) Continuation of application No. 17/231,597, filed on Apr. 15, 2021, now Pat. No. 11,494,940, which is a (Continued)

(51) Int. Cl.
*G06T 7/80* (2017.01)
*G06T 7/246* (2017.01)
(Continued)

(52) U.S. Cl.
CPC ............... *G06T 7/80* (2017.01); *G06T 7/246* (2017.01); *G06T 7/70* (2017.01); *G06V 20/58* (2022.01); *B60R 1/00* (2013.01); *B60R 2001/1253* (2013.01); *G06T 2207/10028* (2013.01); *G06T 2207/30241* (2013.01); *G06T 2207/30261* (2013.01); *G06V 20/625* (2022.01)

(58) Field of Classification Search
CPC .. G06T 7/80; G06T 7/70; G06T 7/246; G06K 9/00805
See application file for complete search history.

(56) References Cited

U.S. PATENT DOCUMENTS 6,690,294 B1    2/2004   Zierden
2007/0083318 A1   4/2007   Parikh
(Continued)

FOREIGN PATENT DOCUMENTS

JP      2010019589    *   7/2008
JP      2010019589 A    1/2010
(Continued)

*Primary Examiner* — Kathleen V Nguyen
(74) *Attorney, Agent, or Firm* — Fletcher Yoder, P.C.

(57) ABSTRACT

A data acquisition system of a vehicle includes an image capture device, a communication interface, and a controller communicatively coupled to the image capture device and communicatively coupled to the communication interface. Processors of the controller are configured to calibrate an image-distance relationship value of an identified component of a first image captured by the image capture device corresponding to a known feature based on established metrics of the known feature. The processors are also configured to provide control of the vehicle or activation of an alert system of the vehicle via the communication interface based on the image-distance relationship value.

20 Claims, 3 Drawing Sheets

Related U.S. Application Data continuation of application No. 15/798,048, filed on Oct. 30, 2017, now Pat. No. 11,010,922.

(60) Provisional application No. 62/415,103, filed on Oct. 31, 2016.

(51) Int. Cl.
  *G06T 7/70* (2017.01)
  *G06V 20/58* (2022.01)
  *B60R 1/12* (2006.01)
  *B60R 1/00* (2022.01)
  *G06V 20/62* (2022.01)

(56) References Cited

U.S. PATENT DOCUMENTS

| | | |
|---|---|---|
| 2008/0059069 A1 | 3/2008 | Trutna |
| 2008/0285804 A1* | 11/2008 | Sefton ................. G06V 20/52 |
| | | 382/105 |
| 2009/0045323 A1 | 2/2009 | Lu et al. |
| 2010/0214126 A1 | 8/2010 | Publicover |
| 2010/0321489 A1* | 12/2010 | Chen .................. G01C 21/32 |
| | | 348/116 |
| 2011/0216201 A1 | 9/2011 | McAndrew et al. |
| 2012/0166083 A1 | 6/2012 | Okabe et al. |
| 2013/0024073 A1* | 1/2013 | Son .................. B60W 30/0953 |
| | | 701/45 |
| 2015/0049193 A1 | 2/2015 | Gupta et al. |
| 2016/0368509 A1 | 12/2016 | Uppal |
| 2017/0147887 A1 | 5/2017 | Be et al. |
| 2017/0205825 A1 | 7/2017 | Wang et al. |
| 2018/0237069 A1* | 8/2018 | Gehin ................ B62D 15/0285 |

FOREIGN PATENT DOCUMENTS

| | | | |
|---|---|---|---|
| JP | 201293960 | * | 10/2012 |
| JP | 2012193960 A | | 10/2012 |

* cited by examiner

US 11,810,327 B1

SYSTEMS AND METHODS FOR CALIBRATING DISTANCE ESTIMATION IN IMAGE ANALYSIS

CROSS-REFERENCE TO RELATED APPLICATION

This application is a continuation of U.S. patent application Ser. No. 17/231,597, filed Apr. 15, 2021, which is a continuation of U.S. patent application Ser. No. 15/798,048, filed Oct. 30, 2017, which claims the benefit of U.S. Provisional Application No. 62/415,103 filed Oct. 31, 2016, each of which is hereby incorporated by reference in its entirety for all purposes.

BACKGROUND

The present disclosure relates generally to distance estimation in image analysis, and more particularly to systems and methods for calibrating distance estimation between vehicles.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

It is now recognized that lower cost, more accessible image capture devices (e.g., vehicle-mounted cameras, smartphones, and the like), may be utilized to facilitate vehicle operation and situation assessment by users.

SUMMARY

In one embodiment, a data acquisition system of a vehicle includes an image capture device, a communication interface, and a controller communicatively coupled to the image capture device and communicatively coupled to the communication interface. Processors of the controller are configured to calibrate an image-distance relationship value of an identified component of a first image captured by the image capture device corresponding to a known feature based on established metrics of the known feature. The processors are also configured to provide control of the vehicle or activation of an alert system of the vehicle via the communication interface based on the image-distance relationship value.

In another embodiment, a method includes receiving, via one or more processors, an image of a vehicle. The method also includes identifying, via the one or more processors, a license plate portion of the image corresponding to a license plate of the vehicle. The method further includes determining, via the one or more processors, a number of pixels of at least one aspect of the license plate portion. The method also includes determining, via the one or more processors, an image-distance relationship value based on the number of pixels and predetermined dimensions of a license plate. The method further includes calibrating, via the one or more processors, distance analysis or speed analysis performed on a subsequent image of the vehicle based on the image-distance relationship value.

In yet another embodiment, one or more tangible, non-transitory, machine-readable media include instructions that cause one or more processors to receive an image of a vehicle. The instructions also cause the one or more processors to identify a license plate portion of the image corresponding to a license plate of the vehicle. The instructions further cause the one or more processors to determine a number of pixels in at least an aspect of the license plate portion. The instructions also cause the one or more processors to determine an image-distance relationship value based on the number of pixels and predetermined dimensions of a license plate. The instructions further cause the one or more processors to calibrate distance analysis performed on a subsequent image based on the image-distance relationship value.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to distance estimation in image analysis, and more particularly to systems and methods for calibrating distance estimation using a portion of an image corresponding to a license plate of a vehicle or a street sign with a standard size. A data acquisition system in accordance with present embodiments may include the image capture device, which may include a vehicle-mounted camera (e.g., dashboard camera or action camera), an integrated camera of an electronic device (e.g., a smartphone or laptop) that may be separate from a vehicle, and the like. Present embodiments include completed integrated vehicle systems or retrofit systems. A controller of the data acquisition system may determine a number of pixels in the portion of the image corresponding to the license plate of the vehicle (e.g., a vehicle traveling in front of the image capture device) and determine an image-distance relationship based on the number of pixels in the license plate portion and predetermined dimensions of the license plate. The controller may then calibrate distance, speed, and/or other dimensional analysis performed on a subsequent image based on the image-distance relationship.

Figure 1:
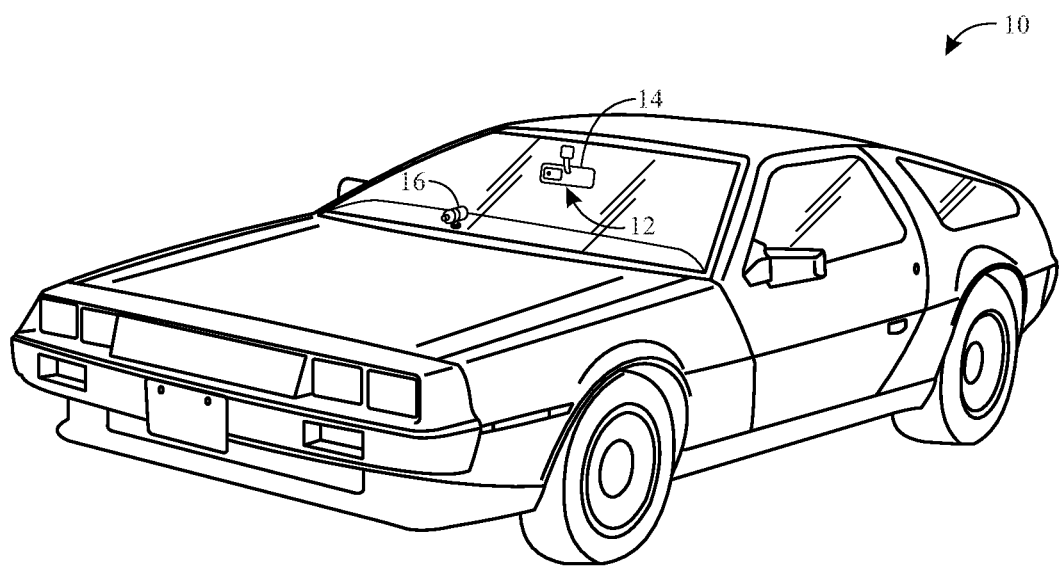
FIG. 1 is a perspective view of a vehicle that includes a data acquisition system in accordance with an embodiment of the present disclosure.

With the foregoing in mind, FIG. 1 is a perspective view of a vehicle 10 that includes a data acquisition system 12 in accordance with an embodiment of the present disclosure. While the vehicle 10 is illustrated as an automobile, it should be understood that the present disclosure applies to any suitable vehicle, such as a truck, motorcycle, commercial vehicle, recreational vehicle, all-terrain vehicle, boat, airplane, snowmobile, and the like. As illustrated, the data acquisition system 12 is mounted to the vehicle 10 via a rearview mirror 14 of the vehicle 10. In some embodiments, the data acquisition system 12 or components of the data acquisition system 12 may be mounted to any suitable portion of the vehicle 10. For example, an image capture device of the data acquisition system 12 may include a dashboard camera 16. It should be noted that an image capture device includes any suitable device that captures images, including, for example, a camera and/or a video capture device. In some embodiments, the data acquisition system 12 or components of the data acquisition system 12 may be mounted to the exterior of the vehicle 10 or separate from the vehicle 10. For example, a controller, communication interface, sensor, and/or the image capture device of the data acquisition system 12 may be part of any suitable computing device in the vehicle 10, such as a smartphone, laptop, wearable device, and the like. Thus, retrofitting is facilitated.

Figure 2:
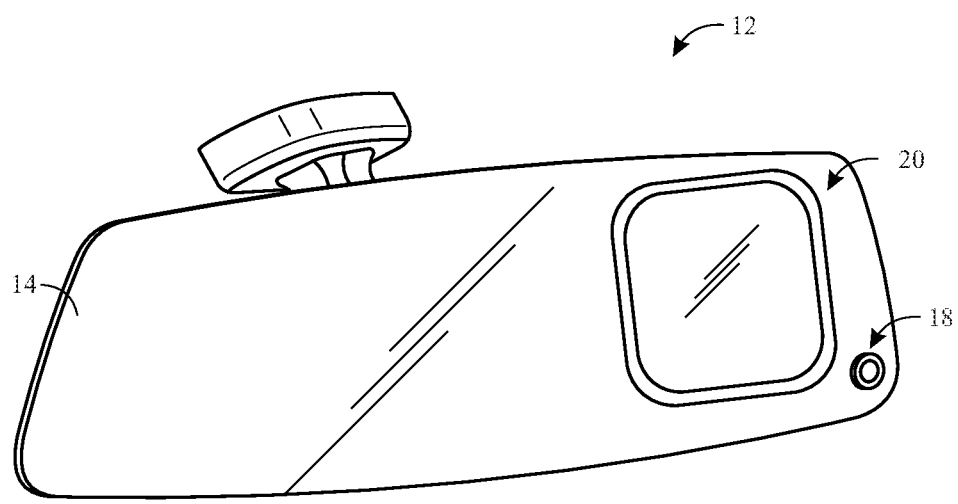
FIG. 2 is a first perspective view of the data acquisition system of FIG. 1 as viewed from inside the vehicle, in accordance with an embodiment of the present disclosure.

FIG. 2 is a first perspective view of a data acquisition system 12 of FIG. 1 as viewed from inside the vehicle 10, in accordance with an embodiment of the present disclosure. As illustrated, the data acquisition system 12 is integrated in the rearview mirror 14 of the vehicle 10. In some embodiments, the data acquisition system 12 may replace the rearview mirror 14. As illustrated, the data acquisition system 12 includes a rear-facing image capture device 18 and a visual display 20 that may provide a video feed of the images captured by the image capture device 18.

Figure 3:
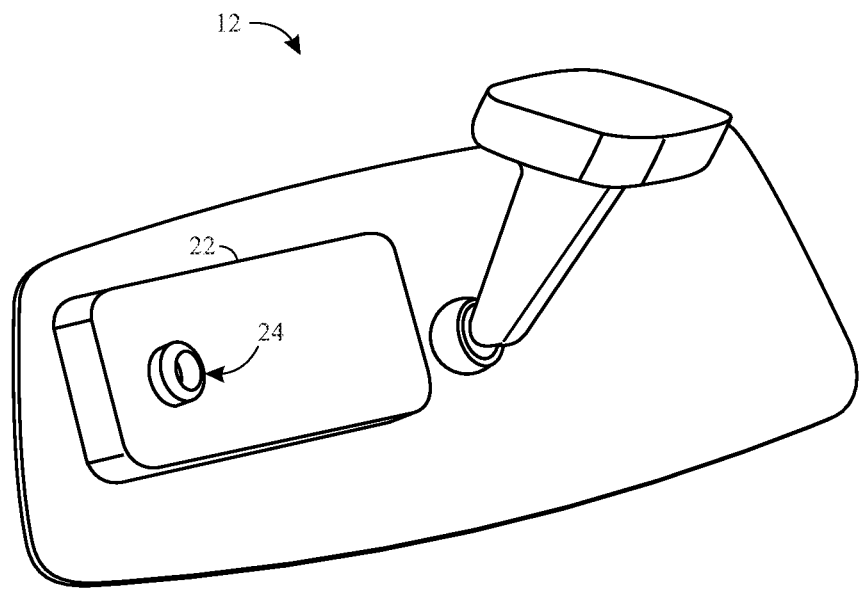
FIG. 3 is a second perspective view of the data acquisition system of FIG. 1 as viewed from the front of the vehicle, in accordance with an embodiment of the present disclosure.

FIG. 3 is a second perspective view of the data acquisition system 12 of FIG. 1 as viewed from the front of the vehicle 10, in accordance with an embodiment of the present disclosure. As illustrated, the data acquisition system 12 includes a housing 22 that may house components of the data acquisition system 12, such as a controller, a communications interface, and the like. The data acquisition system 12 may include a front-facing image capture device 24 that may be used to capture images of other vehicles, road conditions, weather conditions, traffic signals and signs, and other information that may relate to operating the vehicle 10. As mentioned above, the image capture device may include any suitable image capture device, such as the dashboard camera 16, an integrated camera of an electronic device (e.g., a smartphone or laptop) that may be separate from the vehicle 10, and the like. In some embodiments, the image capture device 24 may be pointed in any suitable exterior direction from the vehicle 10. The image capture device 24 may include any suitable frame rate, including any frame rate between 20 and 100 frames per second (fps), such as 23.976 fps, 23.98 fps, 24 fps, 25 fps, 29.97 fps, 30 fps, 50 fps, 59.94 fps, 60 fps, and the like.

Figure 4:
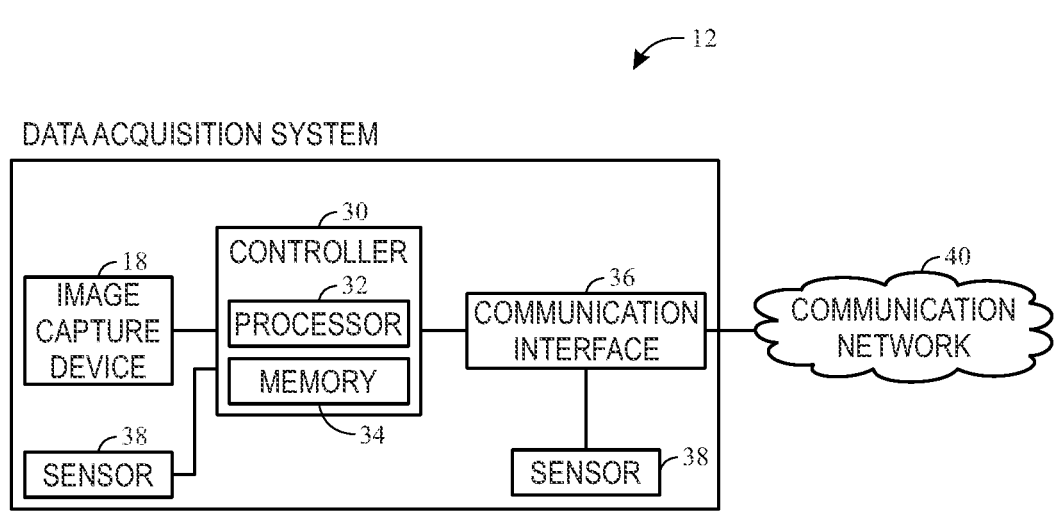
FIG. 4 is a block diagram of the data acquisition system of FIG. 1, in accordance with an embodiment of the present disclosure.

FIG. 4 is a block diagram of the data acquisition system 12 of FIG. 1, in accordance with an embodiment of the present disclosure. The data acquisition system 12 includes a controller 30 that includes one or more processors 32 and one or more memory devices 34. The one or more processors 32 (e.g., microprocessors) may execute software programs and/or instructions to determine a number of pixels in a portion or aspect of an image corresponding to a license plate (e.g., of a vehicle traveling in view of the image capture device 24), determine an image-distance relationship (e.g., between the image capture device 24 and the license plate) based on the number of pixels in the license plate portion and predetermined dimensions of the license plate, and calibrate distance, speed, and/or other dimensional analysis performed on a subsequent image based on the image-distance relationship. An image-distance relationship may be defined as a type of image-distance relationship wherein a number of pixels in a portion of an image corresponds to dimensions of a feature of the real world. An image-distance relationship value or ratio may represent the relationship between the number of pixels of the portion of the image and the dimensions of the feature of the real world to which the portion of the image corresponds. For example, two pixels in an image may correspond to two square feet (e.g., a two feet by one foot rectangle) in the real world. As such, the image-distance relationship value or ratio may be 1 pixel to square feet or 1:1. It should be understood that any suitable image-distance relationship is contemplated, and that the previous example is non-limiting. In additional and/or alternative embodiments, any suitable identified component of the image may be used to calibrate distance, speed, and/or other dimensional analysis performed on a subsequent image based on the image-distance relationship. The identified component may correspond to a known feature having established metrics (e.g., dimensions), such as a stop sign, street sign, fire hydrant, and the like. In some embodiments, the image-distance relationship value may based on the number of pixels in the license plate image portion, the predetermined dimensions of the license plate, and/or a total number of pixels of the image.

Moreover, the one or more processors 32 may include multiple microprocessors, one or more "general-purpose" microprocessors, one or more special-purpose microprocessors, and/or one or more application specific integrated circuits (ASICS), or some combination thereof. For example, the one or more processors 32 may include one or more reduced instruction set (RISC) processors. The one or more memory devices 34 may store information such as control software, look up tables, configuration data, etc. In some embodiments, the one or more processors 32 and/or the one or more memory devices 34 may be external to the controller 30. The one or more memory devices 34 may include a tangible, non-transitory, machine-readable-medium, such as a volatile memory (e.g., a random access memory (RAM)) and/or a nonvolatile memory (e.g., a read-only memory (ROM)). The one or more memory devices 34 may store a variety of information and may be used for various purposes. For example, the one or more memory devices 34 may store machine-readable and/or processor-executable instructions (e.g., firmware or software) for the one or more processors 32 to execute, such as instructions for determining the likelihood and/or the severity of injury to one or more occupants of the vehicle 10. The one or more memory devices 34 may include one or more storage devices (e.g., nonvolatile storage devices) that may include read-only memory (ROM), flash memory, a hard drive, or any other suitable optical, magnetic, or solid-state storage medium, or a combination thereof.

As illustrated, the image capture device 24 is communicatively coupled to the controller 30. As such, images (or videos) captured by the image capture device 24 may be sent to the controller 30 for storage (e.g., in the one or more memory devices 34), analysis (e.g., by the one or more processors 32), forwarding (e.g., via one or more communication interfaces 36), or any other suitable purpose.

One or more sensors 38 may also be communicatively coupled to the controller 30. The one or more sensors 38 may sense information related to operating the vehicle 10. For example, the one or more sensors 38 may include a vehicle speed sensor, a vehicle acceleration sensor, a vehicle location sensor, a vehicle wheel speed sensor, and/or any other suitable sensor related to operating the vehicle 10. As illustrated, in some embodiments, the one or more sensors 38 may be communicatively coupled to the controller 30 via the one or more communication interfaces 36. For example, a vehicle sensor 38 of the vehicle 10 may be communicatively coupled to a vehicle bus (e.g., controller area network (CAN) bus) of the vehicle 10, which may communicate with the one or more communication interfaces 36, which is communicatively coupled to the controller 30. In this manner, the controller 30 may receive information from the vehicle sensor 38 of the vehicle 10.

As illustrated, the data acquisition system 12 also includes the one or more communication interfaces 36. The one or more communication interfaces 36 may enable the controller 30 to communicate with any suitable communication network 40. For example, as discussed above, a communication interface 36 may enable the controller 30 to communicate with a vehicle bus of the vehicle 10. The one or more communication interfaces 36 may also enable the data acquisition system 12 to communicate with additional communication networks 40. For example, a communication interface 36 may enable the controller 30 to communicate with wireless networks (e.g., mobile, WiFi, LAN, WAN, Internet, and the like).

In some embodiments, the data acquisition system 12 may not be contained in a single electronic device, but may be components of multiple electronic devices. For example, the image capture device 24 may be the dashboard-mounted video camera 16, while the controller 30 and the communication interface 36 may be part of a smartphone that belongs to an occupant of the vehicle 10. The controller 30 may communicate with the image capture device 24 via the communication interface 36 of the smartphone and a communication interface 36 of the image capture device 24.

Figure 5:
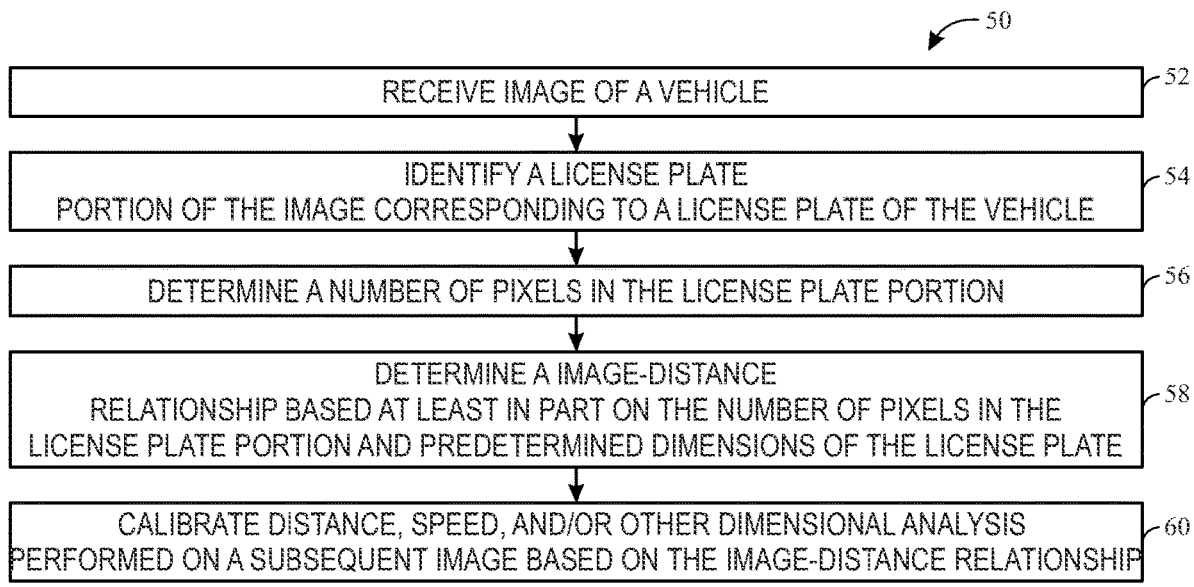
FIG. 5 is a flowchart illustrating a method for calibrating distance estimation in image analysis, in accordance with an embodiment of the present disclosure.

FIG. 5 is a flowchart illustrating a method 50 for calibrating distance estimation using a portion of an image corresponding to a license plate of the vehicle 10 of FIG. 1, in accordance with an embodiment of the present disclosure. In other embodiments, different images may be used (e.g., street signs of a standard size). The method 50 may be performed by any suitable device that may control components of the data acquisition system 12, such as the controller 30. While the method 50 is described using steps in a specific sequence, it should be understood that the present disclosure contemplates that the described steps may be performed in different sequences than the sequence illustrated, and certain described steps may be skipped or not performed altogether. In some embodiments, the method 50 may be implemented by executing instructions stored in a tangible, non-transitory, computer-readable medium, such as the one or more memory devices 34, using a processor, such as the one or more processors 32.

As illustrated, the controller 30 receives (block 52) an image of a proximate vehicle. The image may be captured and provided by any suitable image capture device directed in an exterior direction from the vehicle 10, such as the image capture device 24 and/or the dashboard camera 16. The proximate vehicle may be within a visible distance of the vehicle 10 such that the proximate vehicle may be captured in the image by the image capture device 24.

The controller 30 identifies (block 54) a license plate portion of the image corresponding to a license plate of the proximate vehicle. The one or more memory devices 34 may include software that enables the controller 30 to identify the license plate portion of the image based on, for example, image recognition techniques. The controller 30 may identify the license plate of the proximate vehicle by distinguishing features such as aspect ratio or other characteristics (e.g., the text and numbering on the license plate) that may be programmed or learned in a manner consistent with conventional machine vision techniques. For example, because license plates have a standard size (e.g., license plates in North America are 6 inches by 12 inches (152.40 millimeters by 304.80 millimeters)) and vehicle mounting locations (e.g., back bumpers), the controller 30 may more accurately and effectively identify the license plate of the proximate vehicle. In some embodiments, the controller 30 may identify the license plate by referencing a database of known license plate images. For example, the database may be organized and queried based on geolocation. Because each state (or province) may have one or more corresponding license plate designs, the controller 30 may more accurately and effectively identify the license plate based on correlating the license plate of the proximate vehicle to one or more corresponding license plate designs in the state that the proximate vehicle is traveling. Once the controller 30 has identified the license plate in the image, the license plate may be easily tracked in subsequent images. A number of pixels (e.g., 500 pixels by 1000 pixels) that define the license plate portion of the image may also be tracked from image to subsequent image.

The controller 30 determines (block 56) a number of pixels in the license plate portion of the image. For example, the controller 30 may draw a box or shape around the license plate portion of the image and count the number of pixels in the box or shape. The one or more memory devices 34 may include software that enables the controller 30 to determine the number of pixels in the license plate portion. In some embodiments, the number of pixels may be replaced with a different image measure (e.g., based on display resolution).

The controller 30 determines (block 58) an image-distance relationship based at least in part on the number of pixels in the license plate portion of the image and predetermined dimensions of the license plate. The image-distance relationship relates a number of pixels of the image to a corresponding real world distance. The one or more memory devices 34 may store the predetermined dimensions of the license plate (e.g., 6 inches by 12 inches in North America). For example, the image of the license plate may be 12 pixels high corresponding to 6 inches (i.e., 2 pixels per inch). It should be understood that the previous example is non-limiting, and any suitable image measurement to real world measurement relationship is contemplated. As such, the controller 30 may determine the image-distance relationship based at least in part on the number of pixels in the license plate portion and the predetermined dimensions of a typical license plate.

If the image capture device 24 moves closer (e.g., via the vehicle 10) to the license plate, then the number of pixels of the license plate portion (e.g., from side to side and top to bottom of the license plate portion) may increase. If the license plate portion rotates (or moves laterally) relative to the image capture device 24, then a pixel distance of a leading edge and a trailing edge of the license plate portion may be different. In some embodiments, other factors may be used to refine and/or confirm the image-distance relationship. For example, the speed and/or acceleration of the vehicle 10 (e.g., provided by the one or more sensors 38) may be used to refine and/or confirm the image-distance relationship. The total number of pixels of the image, which may be based on the specifications of the image capture device 24, may also or alternatively be used to refine and/or confirm the image-distance relationship. In alternative embodiments, other uniform or standardized traffic and/or vehicle features may be used for calibration. For example, stop signs, yield signs, traffic lights, traffic light bulbs, car widths, and the like, may be used instead or in addition to the license plate for calibration. Further, for certain determinations (e.g., speed of approach) relative changes may be monitored.

The controller 30 calibrates (block 60) distance, speed, and/or other dimensional analysis performed on a subsequent image based on the image-distance relationship. For example, the controller 30 may receive an additional image from the image capture device 24. The controller 30 may perform distance analysis on a portion of the image (e.g., corresponding to a road hazard) to determine the real world distance to a real world object corresponding to the portion of the image based on the image-distance relationship. For example, the real world object may include a road hazard, such as a pothole or debris, a traffic cone or can, other vehicles, pedestrians, street signs, trees, and the like. The controller 30 may perform speed analysis on a portion of the image (e.g., corresponding to another vehicle) to determine the real world speed of a real world object (e.g., the other vehicle) corresponding to the portion of the image based on the image-distance relationship. That is, if the controller 30 performs the distance, speed, and/or other dimensional analysis on a subsequent image, the distance, speed, and/or other dimensional analysis is performed based on a calibration that factors in the image-distance relationship.

For example, assuming that an orientation of the image capture device 24 remains constant or does not change from image to subsequent image, then image components in a plane of the license plate portion may be calibrated to real world distance units. Because the real dimensions of the license plate are known, the controller 30 may determine an angular orientation between the image capture device 24 and the license plate and/or the distance between the image capture device 24 and the license plate. As the angular orientation and the distance change from image to subsequent image, the controller 30 may determine a relative angular velocity and/or a relative longitudinal velocity between the image capture device 24 and license plate. The controller 30 may then determine or estimate a rate at which the proximate vehicle is rotating (or moving laterally) relative to the vehicle 10 and the rate at which the proximate vehicle is moving longitudinally relative to the vehicle 10. In this manner, the distance, speed, and/or other dimensional analysis performed on the subsequent image may be more accurate.

By calibrating distance estimation in image analysis, a higher degree of accuracy may be realized when estimating distance. Vehicles may be controlled and/or alerts may be provided based on the calibrated distance estimation. Suitable applications of the present embodiments may include, for example, systems (both vehicular and non-vehicular) to provide warnings or alerts (e.g., by activating an alert system of a vehicle, a mobile device, a fixed device such as an electronic street crossing device, or the like) to drivers, pedestrians, and the like, as objects or obstacles approach. Similarly, autonomous and/or semi-autonomous vehicles (e.g., cars, tractors, etc.) may control operation (e.g., accelerate, brake, perform avoidance maneuvers) based on the calibrated distance estimation. For example, cars may be controlled to automatically brake within a threshold distance of an obstacle (e.g., another car, a wall, a tree, etc.) based on the calibrated distance estimation. Additionally, monitoring and/or driving assessment systems that collect driving data for risk control/analysis and/or damage assessment may calibrate distance estimation using the present embodiments.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A system comprising:
   an image capture device associated with a first vehicle;
   a processor communicatively coupled to the image capture device, the processor configured to:
   receive vehicle location data associated with the first vehicle;
   receive a first image of a license plate of a second vehicle captured by the image capture device;
   determine the license plate in the first image based on the license plate correlating to an image of a license plate design based on the vehicle location data;
   calibrate an image-distance relationship value based on established metrics of the license plate; and
   determine a distance to an object in a second image captured by the image capture device, a speed of the object in the second image, or both, relative to the first vehicle based on the image-distance relationship value.

2. The system of claim 1, wherein the vehicle location data indicates a state or geographical region in which the first vehicle is located.

3. The system of claim 2, wherein the processor is configured to determine the license plate:
   querying a database based on the state or geographical region in which the first vehicle is located;
   receiving, from the database, one or more characteristics of license plate designs corresponding to the state or geographical region in which the first vehicle is located; and
   correlating the license plate to at least one of the one or more characteristics of license plate designs corresponding to the state or geographical region in which the first vehicle is located.

4. The system of claim 1, wherein the established metrics of the license plate comprise predetermined dimensions of the license plate.

5. The system of claim 4, wherein the processor is configured to determine the image-distance relationship value based on a number of pixels of the license plate in the first image and the predetermined dimensions of the license plate.

6. The system of claim 5, wherein the image-distance relationship value is based on the number of pixels of the license plate in the first image, the predetermined dimensions of the license plate obtained from:

a database comprising a plurality of images of license plate designs corresponding to different states or geographical regions; and a total number of pixels in the first image.

7. The system of claim 1, wherein the processor is configured to determine the distance between the image capture device and the second vehicle based on the image-distance relationship value.

8. The system of claim 1, wherein the processor is configured to determine a likelihood or severity of an injury to one or more occupants of the first vehicle in the event of a collision with the object or the second vehicle based on the distance to the object, the speed of the object, or both.

9. The system of claim 8, wherein the processor is configured to provide a warning to a mobile device based on the distance to the object, the speed of the object, or both.

10. The system of claim 8, wherein the processor is configured to provide a warning to an alert system of the first vehicle based on the distance to the object, the speed of the object, or both.

11. A method, comprising:
receiving, from an image-capture device associated with a first vehicle, an image of a second vehicle;
receiving location data associated with the first vehicle;
determining a license plate by correlating dimensions of the license plate to one or more characteristics of known license plate designs based on the location data of the first vehicle;
calibrating, via one or more processors, an image-distance relationship value based on a number of pixels corresponding to the license plate and the dimensions of the license plate; and
determining, via the one or more processors, a speed of the second vehicle, a distance to the second vehicle, or both relative to the first vehicle based on the image-distance relationship value.

12. The method of claim 11, comprising determining, via the one or more processors, the license plate of the second vehicle by:
querying, via the one or more processors, a database based on the location data of the first vehicle, wherein the database stores one or more characteristics of known license plate designs corresponding to a plurality of geographical regions;
receiving, via the one or more processors, the one or more characteristics of the known license plate designs corresponding to the geographical region associated with location data of the first vehicle; and
correlating, via the one or more processors, the dimensions of the license plate of the second vehicle to the one or more characteristics of the known license plate designs.

13. The method of claim 12, wherein querying the database based on the location data comprises receiving, via the one or more processors, the location data from a vehicle location sensor of the first vehicle.

14. The method of claim 11, comprising calibrating, via the one or more processors, the speed, the distance, or both by determining an additional speed of or an additional distance to a real-world object captured in a second image.

15. The method of claim 14, wherein the real-world object comprises a pothole, debris, a traffic cone, a traffic can, pedestrians, street signs, or one or more trees.

16. One or more tangible, non-transitory, machine-readable media comprising instructions configured to cause a processor of a first vehicle to:
receive, from an image-capturing device, an image of a second vehicle;
determine a license plate of the second vehicle in the image by:
querying a database based on vehicle location data, wherein the database stores a plurality of characteristics of license plate designs based on the vehicle location data;
receiving one or more characteristics of the license plate designs corresponding to the vehicle location data via the database; and
correlating the license plate to the one or more characteristics of the license plate designs received via the database;
determine a number of pixels corresponding to the license plate; and
determine an image-distance relationship value based on the number of pixels corresponding to the license plate.

17. The one or more tangible, non-transitory, machine-readable media of claim 16, wherein the instructions are configured to cause the processor to determine a distance to an object in a subsequent image based on the image-distance relationship value.

18. The one or more tangible, non-transitory, machine-readable media of claim 17, wherein the instructions are configured to cause the processor to determine a speed of the object in the subsequent image based on the image-distance relationship value.

19. The one or more tangible, non-transitory, machine-readable media of claim 18, wherein the instructions are configured to cause the processor to calibrate the speed, the distance, or both by determining an additional speed of or an additional distance to a real-world object captured in an additional subsequent image.

20. The one or more tangible, non-transitory, machine-readable media of claim 16, wherein the instructions are configured to cause the processor to determine the license plate of the second vehicle in the image by receiving predetermined dimensions of the license plate.

* * * * *